United States Patent [19]

Rabo et al.

[11] 4,019,879
[45] Apr. 26, 1977

[54] SELECTIVE ADSORPTION OF CARBON MONOXIDE FROM GAS STREAMS

[75] Inventors: Jule Anthony Rabo, Armonk; James Nelson Francis, Peekskill; Charles Leslie Angell, Pleasantville, all of N.Y.

[73] Assignee: Union Carbide Corporation, New York, N.Y.

[22] Filed: Sept. 26, 1975

[21] Appl. No.: 617,084

[52] U.S. Cl. .................................... 55/68; 55/75
[51] Int. Cl.² ............................................ B01D 53/04
[58] Field of Search ............ 55/33, 62, 68, 75, 389; 252/455 Z

[56] References Cited

UNITED STATES PATENTS

| 2,254,799 | 9/1941 | Erdmann | 55/68 X |
| 3,849,340 | 11/1974 | Pollitzer | 252/455 Z |

FOREIGN PATENTS OR APPLICATIONS

| 2,130,983 | 12/1971 | Germany | 55/75 |

*Primary Examiner*—Thomas G. Wyse
*Assistant Examiner*—Robert H. Spitzer
*Attorney, Agent, or Firm*—Richard G. Miller

[57] ABSTRACT

Zeolitic molecular sieves having high $SiO_2/Al_2O_3$ molar ratios and containing $Cu^+$ cations are found to exhibit a high degree of selectivity and affinity for CO molecules and are capable of separating CO from gas streams even when water vapor is present.

6 Claims, 1 Drawing Figure

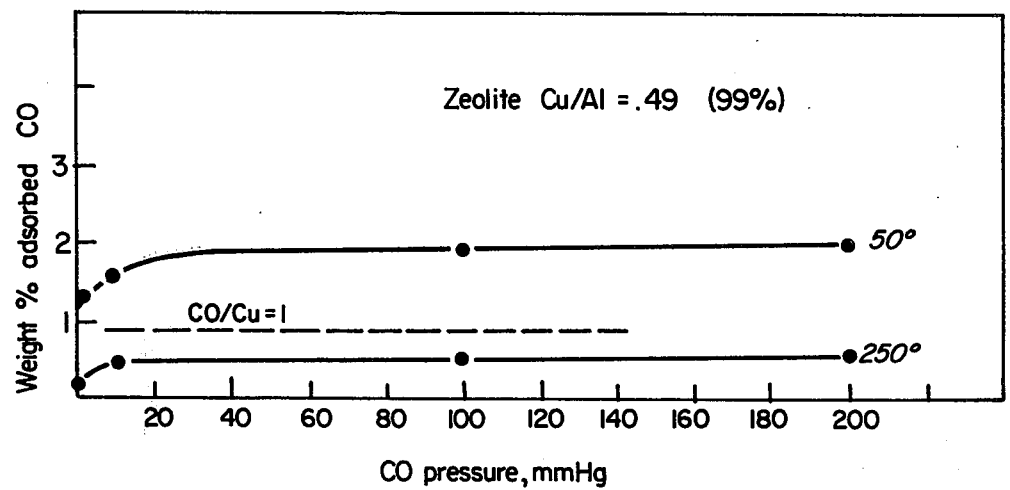

SELECTIVE ADSORPTION OF CARBON MONOXIDE FROM GAS STREAMS

The present invention relates in general to the method for recovering CO from gas streams, and more particularly to the process for selectively adsorbing CO from gas streams using zeolitic molecular sieves.

Since carbon monoxide is a product of the incomplete combustion of carbonaceous fuels, it is contained in various amounts in essentially every stack gas stream wherever carbon-containing gases, solids or liquids are burned. Its toxicity to the higher animal forms is well known, and accordingly it constitutes a serious atmospheric pollution problem in industrial areas.

Because of its strong reducing properties, carbon monoxide is a highly useful industrial gas, and is used commerically in the production of methane, phosgene, alcohols, aldehydes, ketones, organic acids and esters. To recover the CO from waste gas streams for use as a chemical reagent, the two methods most commonly employed heretofore are liquifaction and chemical reaction. Liquifaction is suitable only when the CO-containing gas stream has a relatively low concentration of nitrogen since it is not feasible to separate CO from large amounts of nitrogen by liquifaction. Such gas streams must also be essentially free of water vapor and carbon dioxide since these compounds form solids at the temperature conditions involved and would cause plugging of the various apparatus parts.

A recently proposed chemical method involves the use of a composition, $CuAlCl_4$, in an aromatic base to selectively absorb CO from admixture with nitrogen. The adsorbing medium is said to "coordinately" complex the CO but not the nitrogen which is dissolved in the medium only slightly. CO is recovered from the CO-enriched medium by raising the temperature and collecting the evolved product. The gas streams suitably treated by this procedure must, however, be treated to reduce water vapor to low levels since water reacts with the absorbing medium. The necessary drying operation is accomplished using adsorption on zeolitic molecular sieves. A more detailed discussion of the aforesaid process is set forth in CHEMTECH, May, 1975, pgs. 308–311.

Another and older chemical method involves adsorption of the CO in aqueous solutions of cuprous salts with the formation of complex ions. Either an acid solution of cuprous chloride or an ammoniacal solution of cuprous carbonate or formate may be employed. The adsorption step is operated at room temperature under a pressure of approximately 200 atm., and carbon monoxide containing the small amount of hydrogen that is soluble in the solution is recovered by releasing the pressure and heating the rich liquor above 40° C. The gas may be concentrated by a second cycle, and is then scrubbed with water to remove hydrogen chloride or ammonia, and dried.

Despite the obvious advantages a physical adsorption process would have over the aforesaid liquifaction and chemical methods for recovering CO from waste gas streams, solid adsorbents which exhibit a substantial degree of selectivity for CO have not been available. This is due in part to the small polar character of the CO molecule, and high volatility of CO and the relatively high polarity of $H_2O$ vapor and $CO_2$ commonly present in gas streams being treated for CO recovery.

We have now discovered, however, that carbon monoxide can be selectively adsorbed from gas streams, even those containing water vapor and carbon dioxide, by contacting the said stream at a temperature of from 0° C. to 300° C. with an adsorbent mass comprising crystalline zeolite molecular sieves having a framework $SiO_2/Al_2O_3$ molar ratio of from 20 to 200, preferably of from 20 to 100, and containing as structural constituents monovalent copper cations. Pressure is not a critical factor.

Since the zeolite adsorbents used in the present process effectively adsorb CO even at very low partial pressures of the adsorbate, both purification and bulk separation adsorption procedures can be carried out. Accordingly gas streams containing as little as 10 ppm (volume) of CO can be purified by the present process, but it is preferred to utilize the process to make bulk separations of CO from gas streams containing at least 5 volume-% CO. These CO-rich gas streams are abundantly available as product or vent gases from steam reforming, refinery processes, methanol plants, coke ovens, carbon black furnaces and blast furnaces are all suitably processed by the present invention. Individual constituents of these gas streams include nitrogen, carbon dioxide, hydrocarbons, water vapor, sulfur compounds $NO_x$ and the like. Because blast furnace vent streams can contain as much as 20% by volume of CO, these are advantageously treated by the present process to recover CO as a chemical raw material finding important utility as a fuel or as a reagent in chemical synthesis. A typical blast furnace vent gas stream contains the following combination of constituents:

CO - 27.5 vol.-% (dry basis)
$CO_2$ - 11.5 vol.-% (dry basis)
$N_2$ - 60 vol.-% (dry basis)
$H_2$ - 1 vol.-% (dry basis)
$H_2O$ - saturated at 1 atm.

It will be understood, of course, that although the zeolite adsorbents of the present process have a high affinity for CO as an adsorbate, and thus are quite tolerant of a wide variety of chemical constituents in the gas streams used as feedstock, it is nevertheless advantageous to avoid the presence of undue amounts of oxidizing components, particularly oxygen, which tend to deactivate the zeolite by converting a fraction of the $Cu^+$ cations to $Cu^{++}$ cations.

The crystalline zeolitic molecular sieves of the class suitable for use in the practice of this invention are those species which have pore diameters large enough to adsorb CO and which have or are modified to have framework $SiO_2/Al_2O_3$ molar ratios of from 20 to 200, preferably from 20 to 100. A number of synthetic zeolite species are available which have sufficiently high $SiO_2/Al_2O_3$ molar ratios in the as-synthesized form. These include zeolite Ω as defined and disclosed in U.S. application No. 655,318, filed July 24, 1967, zeolites ZSM-5, ZSM-8, ZSM-11 and ZSM-12 as disclosed in detail in U.S. Pat. No. 3,702,886. There are also available a variety of techniques for increasing the Si/Al ratios of zeolite species which have not yet been crystallized in forms sufficiently siliceous for use in this invention. One such method involves steaming the zeolite which is at least partially in the hydrogen cation form at temperatures within the range of 800° to 1500° F. followed by extraction of the thus-loosened alumina from the zeolite structure with dilute mineral acids or organic chelating agents. The procedure is defined in detail in U.S. Pat. No. 3,506,400 issued Apr. 14, 1970.

Another method in which a partially decationized form of the zeolite is treated with acetylacetone to extract framework alumina is described in U.S. Pat. No. 3,640,681 issued Feb. 8, 1972. The zeolites having $SiO_2/Al_2O_3$ molar ratios increased by such means to the range of 20 to 200 are satisfactory for the present process.

To prepare the monovalent copper cationic form of the aforesaid zeolites the $Cu^+$ ion can be introduced directly into the zeolite by ion-exchange using a non-aqueous medium, or a $Cu^{++}$ ion exchanged form of the zeolite can be subjected to any of several treatments to reduce the bivalent copper cation to its monovalent form. A common method for this purpose is heating the $Cu^{++}$ zeolite to modestly elevated temperatures, i.e. about 200° C. to 250° C., in a hydrogen atmosphere for from 2 to 4 hours. We have found, however, that the hydrogen is a somewhat stronger reducing agent than is required for the purpose, and at high temperatures exhibits a tendency to reduce some of the $Cu^{++}$ cations to metallic copper with the consequent loss of some of the adsorptive capacity of the zeolite product for CO.

A preferred method is to use CO as the reducing agent and to contact the $Cu^{++}$ ion form of the zeolite with an atmosphere of CO and water vapor at a temperature of at least 250° C., preferably at least 300° C. for a period of from 3 to 10 hours. A mixture of 3% by volume $H_2O$ and 97% CO provides an effective reducing atmosphere.

Another preferred method of converting the $Cu^{++}$ zeolitic cations to the $Cu^+$ form is to contact the starting zeolite with the same feedstock which is ultimately to be used in the CO recovery process. The method is especially preferred when the feedstock contains relatively high concentrations of CO and/or hydrogen.

As is disclosed in the copending application of P. H. Kasai et al., Ser. No. 617,083 filed Sept. 26, 1975 entitled "Preparation of $Cu^+$ Zeolites," the $Cu^{++}$ cations of some zeolites are spontaneously reduced to $Cu^+$ cations upon dehydration at elevated temperatures. The reduction of the $Cu^{++}$ cation to $Cu^+$ occurs when the degree of dehydration is sufficient to greatly diminish the stabilizing influence of the adsorbed water on the $Cu^{++}$ cation and permit reaction of a water molecule with the $Cu^{++}$ cation.

Regardless of the manner in which $Cu^+$ cations are introduced into the zeolite, the more of these cations present the greater the adsorptive capacity of the zeolite for CO.

The reasons why the zeolites of the present invention have a greater selectivity for CO molecules than $H_2O$ molecules, even though most $Cu^+$ zeolites behave in the contrary manner, is not precisely known. It would have been expected that the $Cu^+$ cations of the zeolite would retain a hydrophilic character even though the zeolite structure exhibited the hydrophobic nature sometimes associated with high $SiO_2/Al_2O_3$ molar ratios. It has been surprisingly found, however, that the $Cu^+$ cations, far from being hydrophilic centers, show an exceptional degree of hydrophobicity in marked contrast to $Co^{++}$ cations, for example, in the same zeolite. It is likely that the ultimate explanation of this phenomenon will depend upon an elucidation of the manner in which $Cu^+$ ions are bound to various zeolite lattices, a subject on which there is currently no available data whatsoever.

EXAMPLE 1

(Preparation of Adsorbent)

A sample of zeolite ZSM-5 having a dehydrated chemical composition expressed in terms of mole ratios of oxides of 0.9 $Na_2O$: $[Pr_4N]_2O$: $Al_2O_3$: 32 $SiO_2$ wherein Pr = n-propyl, was calcined at 600° C. in a stream of air to produce the corresponding hydrogen form of the zeolite. Thereafter the zeolite was ion exchanged using an aqueous solution of copper nitrate as the exchange medium. To prevent precipitation of basic copper salts, the zeolite crystals were slurried in water at a pH of about 4 prior to contact with the copper nitrate solution. Three consecutive exchanges were carried out at reflux providing a 4-fold stoichiometric excess of $Cu^{++}$ cations. The product $Cu^{++}$ zeolite was filtered and washed with water, resuspended in boiling water as a final washing, filtered, and dried at 100° C. in air. Reduction of the $Cu^{++}$ cations to the $Cu^+$ form was accomplished by contacting the sample with a CO gas stream containing 3 weight-% water vapor at a temperature of 300° C. for 6 hours. The zeolite crystals were simultaneously activated by the reduction treatment and in condition to serve as an adsorbent mass after desorption of CO therefrom using a nitrogen purge at 350° C.

EXAMPLE 2

The $Cu^+$ ZSM-5 sample prepared in Example 1, supra, was employed to selectively adsorb CO from a simulated blast furnace vent gas having the following composition:

CO - 27.5 vol.-% (dry basis)
$CO_2$ - 11.5 vol.-% (dry basis)
$N_2$ - 60 vol.-% (dry basis)
$H_2$ - 1 vol.-% (dry basis)

The gas stream also was saturated with water vapor at 1 atmosphere and 50° C. In the treatment of the gas stream, the $Cu^+$ zeolite was contained in a fixed adsorption bed and maintained at 50° C. during the adsorption stroke. The simulated vent gas stream was passed through the bed at a pressure of 1.2 atmospheres until breakthrough of the CO adsorption front. Desorption and recovery of the CO adsorbate was accomplished by decreasing the pressure of the adsorption bed through the egress end thereof to 20 mm. Hg.

In the drawings the figure is an adsorption isotherm for a ZSM-5 type $Cu^+$ zeolite having a $SiO_2/Al_2O_3$ molar ratio of 46. The zeolite was free of organic structural cations and had a $Cu^+$/Al atomic ratio of 0.49. In preparing the zeolite adsorbent, a sample of the $Cu^{++}$ exchanged zeolite (99% $CU^{++}$) was converted to the $Cu^+$ form by heating in vacuum at 100° C. to remove excess water and then treated with CO at 300° C. for several hours in a conventional McBain system. After evacuating and refilling the system with fresh CO, the samples were left for 16 hours at the same temperature to complete the reduction. Thereafter evacuation for several hours at 300° removed the adsorbed CO, and left the samples ready for determination of their CO isotherms. After each addition of CO, readings were taken at 15-minute intervals until constant weights were achieved.

What is claimed is:
1. Process for removing carbon monoxide from a gas stream comprising at least 10 ppm CO by volume and at least one other constituent selected from the group consisting of $H_2O$ and $CO_2$ which process comprises passing said gas stream at a temperature of from 0 to 300° C. through an adsorbent mass of a crystalline zeolitic molecular sieve having a framework $SiO_2/Al_2O_3$ molar ratio of from 20 to 200 and having as zeolite constituents monovalent copper cations, whereby CO molecules are adsorbed and a CO-depleted effluent gas stream is obtained.

2. Process according to claim 1 wherein the framework $SiO_2/Al_2O_3$ molar ratio is from 20 to 100.

3. Process according to claim 2 wherein the CO-containing gas stream comprises at least 5 volume percent CO.

4. Process according to claim 3 wherein the gas stream comprises CO, water vapor, $CO_2$ and $N_2$.

5. Process according to claim 3 wherein the gas stream consists essentially of CO, $CO_2$ and $H_2$.

6. Process according to claim 3 wherein the gas stream is the vent gas stream from a blast furnace.

* * * * *